C. F. BOSWORTH.
Sewing-Machine.

2 Sheets--Sheet 1.

No. 6,467.

Reissued June 1, 1875.

Witnesses.
H. Shumway
Clara Broughton

The Straw Sewing Machine Co.
assignees of Chas. F. Bosworth
Inventor
By atty.
John E. Earle C. F. BOSWORTH.
Sewing-Machine.

2 Sheets--Sheet 2.

No. 6,467

Reissued June 1, 1875.

Witnesses.
J. Shumway
Chas. Broughton.

The Straw Sewing Machine Co.
assignees of Chas. F. Bosworth.
Inventor.
By atty.
Wm. E. Earle

UNITED STATES PATENT OFFICE.

CHARLES F. BOSWORTH, OF MILFORD, CONNECTICUT, ASSIGNOR, BY MESNE ASSIGNMENTS, TO THE STRAW-SEWING-MACHINE COMPANY.

IMPROVEMENT IN SEWING-MACHINES.

Specification forming part of Letters Patent No. 38,807, dated June 9, 1863; reissue No. 6,467, dated June 1, 1875; application filed May 5, 1875.

*To all whom it may concern:*

Be it known that I, CHARLES F. BOSWORTH, (formerly of New Haven,) of Milford, in the county of New Haven and State of Connecticut, have invented a new Improvement in Sewing-Machines; and I do hereby declare the following, when taken in connection with the accompanying drawings and the letters of reference marked thereon, to be a full, clear, and exact description of the same, and which said drawings constitute part of this specification, and represent, in—

Figure 1:
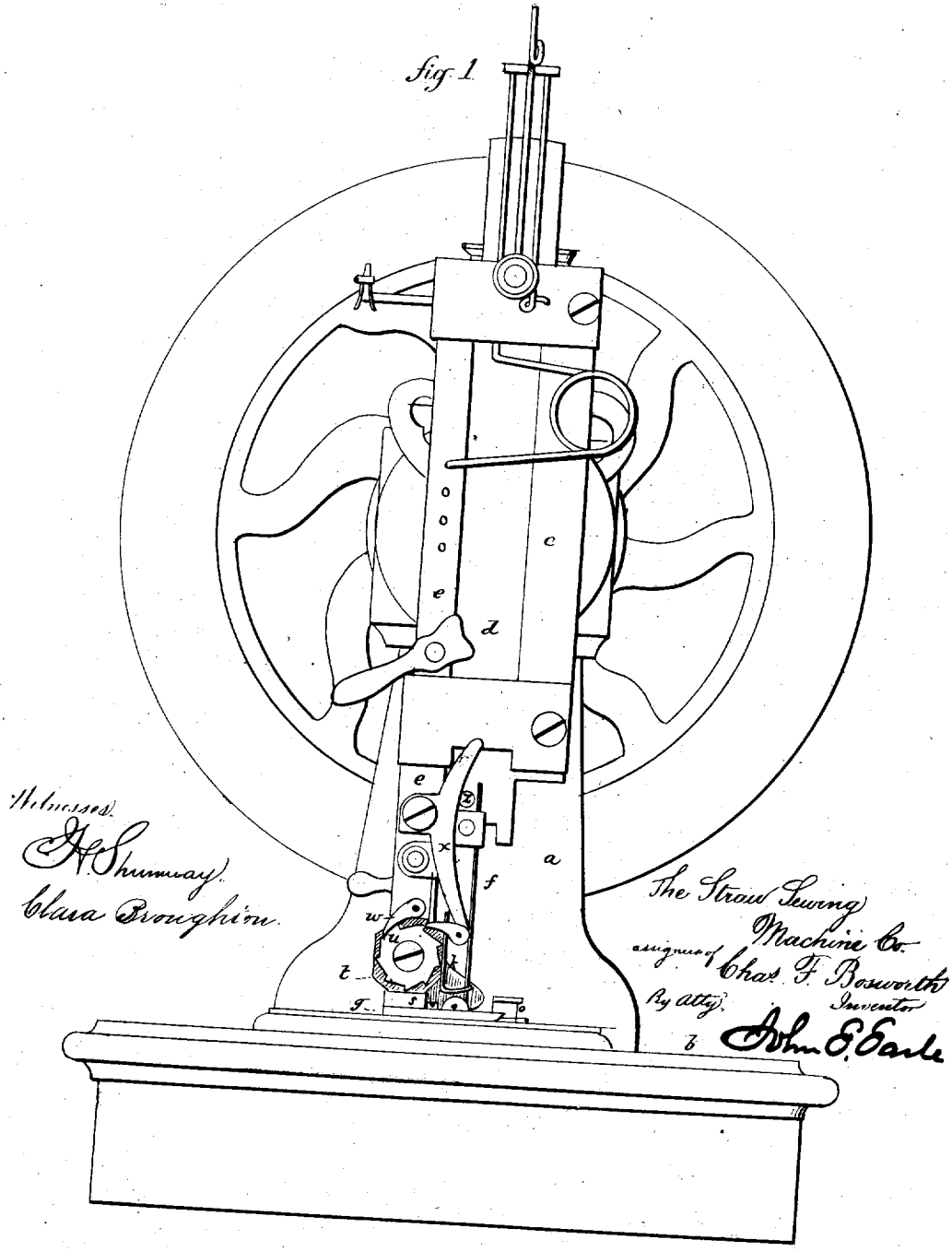
Figure 2:
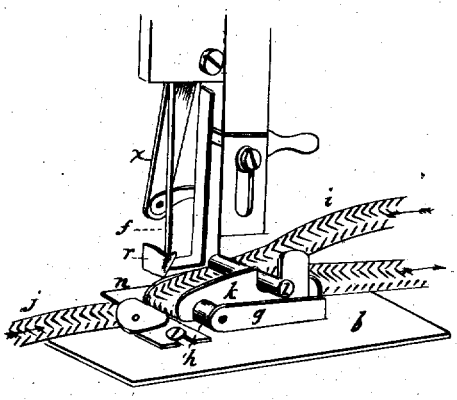
Figure 3:
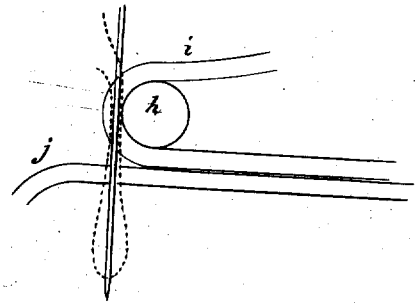

Figure 1, a front elevation of a sewing-machine with my improvement attached; Fig. 2, a partial view, in perspective, of the braid binding and presenting mechanism, the gages and needle-presser, and supporting-surface; and Figs. 3, 4, 5, 6, sketches, exhibiting, on a large scale, the roller over which the braid is bent and presented directly to the needle to be stitched, and the figures represent different varieties of stitch which may be made by the use of my improvements.

This invention relates to a sewing-machine specially adapted to sew straw-braid or other narrow plaited strips or material, such as hair, chip, palm-leaf, &c., and in the manufacture of hats, caps, and bonnets.

Braids of straw, &c., are commonly sewed by hand, the stitch being long and of such character that little or none of the thread appears upon what is usually termed the right side, and a sewing-machine of ordinary construction cannot be practically used for this purpose, because in such machines the thread forming the stitch would extend equally on each side of the fabric, or appear extended on both sides of the united braids, from needle-puncture to needle-puncture; and this construction, besides being so objectionable in appearance as to prevent the sale of goods so sewed, would also present long loops of thread on the outer side, which would be liable to be caught and broken, destroying the integrity of the fabric or head-covering.

My improvements are applicable, under certain changes of form, to most of the sewing-machines now in use, and making different varieties of stitch, the precise method of confining the loops of upper thread passed through the goods by an eye-pointed piercing-needle being immaterial, so far as the sewing of straw is concerned; but I have experimented chiefly upon shuttle-machines, and reduced my invention to practice on such a machine, and have in the drawings shown my improvements as applied to and acting in combination with a Singer machine with a transverse shuttle. These and other sewing-machines are so well known in the market and to manufacturers and workmen, that any detailed description of the construction or operation thereof is deemed unnecessary.

This invention consists in the combination, with a sewing mechanism, of mechanism for guiding the straw or other braid, and presenting it in a folded condition, substantially as herein described, between the point of the needle and the braid to which it is to be sewed, whereby the stitch for uniting the braid is formed by passing the needle through the braid when folded, and so that the thread uniting the braid appears but little, if at all, on that surface of the braid which is to form the outer side of the hat, or appears on that surface to a less extent than on the inside of the hat.

Also, in the combination of a guide over which the material is bent in the act of sewing, and its gage, with a gage for the edge of the material to which such bent braid is to be sewed, whereby the edges of the narrow braids are lapped evenly and uniformly, as is necessary for the rapid formation of a hat or bonnet.

Also, in the combination, with a braid-guiding device, of a roller located just back of the plane in which the needle reciprocates, and above and at right angles to the feed, whereby the braid is bent and presented to the needle, and is relieved from unnecessary friction on account of the movement of the roller, and at the same time the roller presents an opposing surface for the support of the braid against the action of the feed.

Also, in the combination of the presser-foot and a guide or roller over which the braid is bent, and which is adapted to guide and present to the needle the braid to be sewed, with a supporting-surface to sustain the braid or fabric, to which the braid carried by the presser is to be stitched, against the thrust of the needle, whereby the braid, being presented in a folded condition to the needle, may be lapped over the edge of, and united to, the upper side of the braid, sustained by the supporting-surface.

Also, in the combination, in a straw-braid sewing-machine, of a roller or its equivalent, over which the braid is bent, with a needle-guard or deflector to prevent the needle from glancing from the hard surface of the braid, and also to cause the needle to penetrate the braid more or less, or not to penetrate it at all, as hereinafter described.

The machine shown in the drawing is of the type known as the Singer. The arm *a* rises from the supporting-surface *b*, and carries at its forward end the head *c*, in which moves the needle-bar *d* and presser-bar shank *e*, all of ordinary construction. The eye-pointed needle *f* carries a thread controlled by a take-up, and its loop is locked below the braid by the thread carried by a shuttle working in a race below the supporting-surface.

The feed apparatus may be of any known kind which is capable of advancing braid to be stitched between the presser and supporting-surface *b*.

The distinguishing peculiarity of the stitch for sewing straw-braid made by the use of my improvement is this, namely, that the piercing-needle and the thread it carries enters a piece of braid at the face or side which is to rest against the other piece of braid to which it is to be sewed, and the needle in its continued puncturing movement finally leaves that first piece of braid on the same side at which it entered, and then, in its further movement, penetrates from side to side through the braid to which the first-mentioned braid is to be sewed, and the needle-loop is then locked. This is the leading idea on which my invention is based, and the improvements carry this idea into practice. There is, therefore, attached to the presser-foot bar, or to some other convenient part of the machine, a frame, *g*, which carries a roller, *h*, located just back of the plane in which the needle reciprocates, and whose axis is at right angles, or nearly so, with the line of progression of the cloth. The upper of the two pieces of braid to be stitched together, *i*, passes over this roller *h*, then under it, and thence against and above the other piece of braid, *j*, and the roller *h* holds the piece of braid to be sewed down upon the other piece of braid to which it is to be sewed.

In order to keep the upper braid in position sidewise, there is an adjustable gage, *k*, which may be attached to the frame *g*; and in order to make the upper braid apply itself closely to the roller *h* there is supported in the frame or attached to the presser-foot another bar or roller, *l*, which rests upon the surface of the braid *i*. I prefer to attach this bar to a slide clasping the presser-foot rod, and adjustable thereon by a set-screw, so that the bar or roller *l* may be set to adapt itself to different thicknesses of braid, and to smooth it on its passage to the needle.

The edge of the piece of braid *i* is guided by a gage, *n*, forming part of the frame *g*, inside of the path in which the needle moves, and inside the needle-hole, and in this way the braid is so controlled that the needle penetrates it close to, and at a uniform distance from, its edge.

In order to guide the under piece of braid, there is attached to the supporting-surface *b* an adjustable gage, *o*, its gaging-face being outside the needle-hole, and aside from the face-gage *n*, so that the edge of one braid overlaps the edge of the other, the extent of the lap being governed by adjusting the gage *o*.

By this provision of a gage for each braid as they are being united it is possible to lap the edges of the narrow braids uniformly and rapidly by machinery, and the hat, cap, or bonnet may be regularly and evenly made. This is of great importance, for without these two gages it would be very difficult, if not quite impossible, to evenly lap the braid, and the hat could not then be made to assume a proper symmetrical shape.

In sewing with the contrivance as thus far described, a single piece of braid, or the braid on the edge of a number of pieces already stitched together, is to be introduced under the presser-foot or frame *g*, (see Fig. 2,) and another piece of braid is to be passed under the bar *l*, and thence over and under roller *h*.

Figure 4:
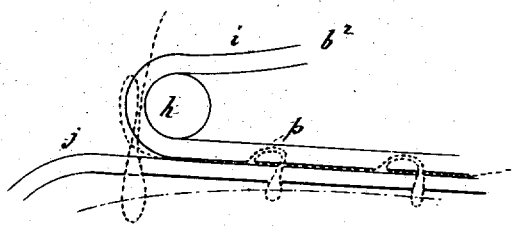
Figure 5:
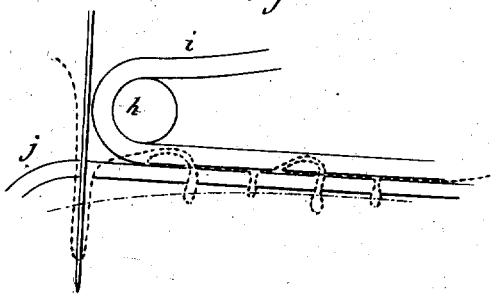
Figure 6:
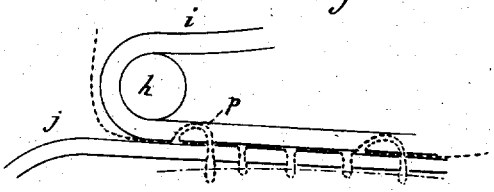

If the roller *h* be properly set with reference to the plane or path in which the needle moves, the latter will pass into the folded or bent upper braid *i*, and out of it again, on the same side that it entered, and thence through the lower braid *j*, (see Fig. 3,) and its thread may appear on the upper surface, as in Fig. 6, at *p*; or, if the braid *i* be thick, or the roller *h* farther from the needle, the thread may not appear at all on the upper surface, but assume a position as shown in Fig. 4, and when the needle-loop has been secured below the lower braid *j*, and the needle has risen out of both pieces, then the feed will advance both braids, and in so doing will carry the upper braid *i* over the bending-roller *h*, so that it may be pierced at a different spot on the next descent of the needle, the feed and roller, by their combined action, presenting the upper braid properly, and with its edge lapped on the top of the braid on the surface *b*, which supports it against the thrust of the needle *f*. The needle will not, however, with certainty properly penetrate the braid *i* presented as a rounded surface, as it is liable to glance away, owing to the hard exterior surface of the straw or other braid; and to prevent the needle from springing away from the braid, or glance off, I provide a needle-guide, *r*, to deflect the needle, so that its point will pass with relation to the roller as the exigency of the stitch to be produced demands.

I herein show the needle set, so that it will not pierce the upper piece of braid at all, unless it is bent or sprung over toward the roller on its descent, and I apply to the presser-foot, or other convenient support, a needle-guard, *r*, which springs the needle *f* over toward the roller *h*, when the needle-point enters the guard.

A bent piece of metal with a conical hole in it, or a simple surface standing nearly upright, but inclining away from the needle at its upper edge, answers well the purpose of a needle-guard.

The guard shown in the drawings has two surfaces meeting at an angle or apex, through which the needle passes.

By means of this addition the needle is forced to pierce in the desired line, and the operation of sewing is rendered certain. The loops of needle-thread passed through the lower braid *j* are to be confined by a shuttle-thread, as shown in the drawings, or by a looped thread, as in the Grover and Baker sewing-machine, or by a loop of its own thread, as in chain or crochet stitch sewing-machines, and the stitch is drawn tight when the braid passes away from the roller *h*, under the action of the feed.

As the seam is stronger when the needle-thread shows on the upper surface, and as it is desirable that it should show only at long intervals, farther apart than can be conveniently fed or sewed in a sewing-machine in the interval between one stitch and another, I have devised a contrivance by the use of which a portion of the stitches will be made only in the lower braid. In order to do this the needle is set, as before, and the needle-guard *r* is mounted upon a spring-arm, which tends to press it toward the roller *h*, while an adjustable stop, *s*, (see Fig. 1,) regulates the distance to which it shall approach the roller.

Upon the presser-foot bar there is mounted, so that it can turn, an irregularly polygonal plate, *t*, having secured to it a ratchet-wheel, *u*, provided with a detaining-pawl, if necessary, as at *w*, and with an actuating-pawl pivoted to a crooked lever, *x*, which is pivoted on the presser-foot bar *e*. A pin, *z*, is attached to the needle-bar *d*, and the crooked lever and pin are so arranged relatively to each other that each stroke of the needle-bar reciprocates the pawl, and, consequently, turns the irregular plate, which bears against the spring-support of the guide. By shaping this plate properly the needle can be caused to pierce the upper piece of braid only at every other stitch, or every second, third, or fourth, or greater or less number of stitches, as desired, so that seams may be sewed like those in Figs. 5 or 6; or, by proper shape and adjustment of the parts, seams may be sewed where the upper thread shows at intervals on the upper surface of the upper braid, and at other times merely catches into the upper braid; or seams may be sewed having some stitches showing in the upper surface of the upper braid, others catching into it and not showing, and others still which do not touch the upper braid at all. In sewing such seams the needle springs away from the roller, and is drawn toward it at the time and to the extent desired by the needle-guard, the latter being governed by the irregularly-shaped plate.

The whole contrivance, therefore, is one for controlling the correct presentation of the needle through or into the braid *i* on the roller *h*, and for vibrating the needle to and fro in the direction of the line of the seam, and any contrivance that will so cause the needle to piece with certainty, or not pierce the upper braid, as desired, may be substituted for the apparatus specially described.

Where a vibrating needle as thus described is used, the feed apparatus feeds both the upper braid and the material to which it is to be stitched, as before stated, and presents both braids in such manner by the aid of the roller that the needle may puncture either both braids or one braid only, depending upon the line in which the needle descends.

The bar *l* and guide *d* might be dispensed with, and the braid be kept in position by the fingers, the gist of the invention being to hold one piece of braid to be sewed to form the body or substance of a hat or bonnet, with reference to the braid or other material of the hat or bonnet, to the edge of which it is to be stitched, and in reference to the needle, in such manner that the needle shall enter and leave the upper braid on the same side thereof, and shall afterward pierce the lower braid or piece of stuff to which the upper braid is to be sewed, the latter being sustained on a supporting-surface, and against the thrust of the piercing-needle.

As before stated, any proper feeding apparatus may be used; but I prefer that commonly known as the four-motion roughened-surface feed.

As the braids to be sewed together are sometimes of considerable thickness, and as one lies on the top of the other, the uppermost braid will be held slightly above the table or platform of the machine. An ordinary feeding-bar will, therefore, act most effectually, if not entirely, on the lower braid; but as the sewing, owing to the great length of the stitches, will be better if the feeding device acts equally on both braids, I intend, sometimes, to use independent feeds, one adjusted for each braid, and, when using a four motion feed, to split the feeding-bar at or about the line of junction of the braids, thus making two feeding-bars, and to apply a set-screw, or some equivalent device, so that the two bars may have their relative heights or levels adjustable the one to the other, thus causing that bar which acts upon the upper braid to work at the highest level, so that this braid may be as effectively fed as the lower.

In sewing hat-brims and other curved work, one braid—that nearest the center of the hat—must, of necessity, move through a less distance than the other; and, in order to make the feed adapt itself to both, so as not to wrinkle either, and in order, also, to regulate the curvature of the seam, I intend to make one feed move at each stitch through a greater distance than the other. This object may be attained most easily by advancing two feeding-bars by the same cam, and by regulating their retreating motion by separate stops, one or both of which may be adjustable, and acting like the adjustable feed-regulators well known to constructers of sewing-machines.

The braid *i* is uppermost, and is delivered to the bending mechanism from a suitable source beyond $b^2$, where the braid is shown as broken off. The arrows, Fig. 2, show the direction of the movement of the material, and the braid *j*, which represents the united material, is moved back from the gage *o*, and it will be apparent from the lap of the braid that the hat is commenced at that portion of it which is to form the outer edge of the rim, and is worked inward in gradually-smaller curves until the crown is reached, when the sides of the crown are made of layers of uniform size, provided the crown is cylindrical or oval, or of gradually-decreasing circles toward the center of the top of the crown where the hat is finished. In this way the successive coils from the edge toward the center of the hat are lapped each over the inner edge of a preceding coil.

Having described my invention I claim—

1. The combination, with sewing mechanism, of mechanism adapted to guide straw or other plaited braid, and present it in a bent or folded condition between the point of the needle and the braid to which it is to be sewed, supported on a supporting-surface against the thrust of the needle, substantially as described.

2. The combination of a roller or guide, over which the braid is bent, and the gage for the edge of the bent strip with a supporting-surface, and a gage for the edge of the braid, to which the bent braid is to be united, substantially as described.

3. The combination of the movable roller, about which the braid is bent, and the supporting-surface and feeding device arranged in opposition to the roller, with the needle arranged just in advance of the roller, whereby the bent braid is united to the top of the other braid, supported on the supporting-surface by a series of stitches, substantially as described.

4. The combination, with the sewing mechanism, the presser, and the supporting-surface, of the gages arranged at opposite sides of the needle-hole, and adjusted to guide the lapped edges of two pieces of fabric, substantially as described.

5. The combination, in a straw-braid sewing-machine, of a roller, over which the braid is bent to be sewed, with a needle guard or deflector, substantially as described.

6. The improvement in the art of manufacturing hats from substantially a continuous braid, consisting in laying the braid in successive coils or rows, commencing at the edge of the brim, and overlapping each successive coil or row on the inner edge of the braid of a preceding coil or row, and uniting the same by stitches, substantially a described.

CHARLES F. BOSWORTH.

Witnesses:
JOHN E. EARLE,
G. W. GREGORY.